United States Patent [19]

Kuwana et al.

[11] Patent Number: 5,236,255

[45] Date of Patent: Aug. 17, 1993

[54] ANTI-SKID CONTROL SYSTEM HAVING DUAL PRESSURE INCREASE MODES

[75] Inventors: Kazutaka Kuwana, Toyota; Kuniaki Okamoto, Nagoya; Tsuyoshi Yoshida, Obu; Hiroyuki Ichikawa, Okazaki; Masaru Kamikado, Anto; Satoshi Itabashi, Toyota, all of Japan

[73] Assignee: Aisin Seiki Kabushiki Kaisha, Kariya, Japan

[21] Appl. No.: 777,610

[22] Filed: Oct. 16, 1991

[30] Foreign Application Priority Data

Oct. 16, 1990 [JP] Japan .................. 2-278894

[51] Int. Cl.$^5$ .............................................. B60T 8/02
[52] U.S. Cl. ..................................... 303/106; 303/105
[58] Field of Search ................. 303/93, 100, 105, 106, 303/107, 109, 108, 110; 364/426.02

[56] References Cited

U.S. PATENT DOCUMENTS

| | | | |
|---|---|---|---|
| 3,727,992 | 4/1973 | Bowler et al. | 303/107 |
| 3,829,168 | 8/1974 | Schnaibel et al. | 303/105 |
| 3,880,474 | 4/1975 | Scharlack | 303/109 |
| 4,392,202 | 7/1983 | Matsuda | 303/93 |
| 4,446,522 | 5/1984 | Sato et al. | 303/105 |
| 4,741,580 | 5/1988 | Matsubara et al. | 303/105 |
| 4,748,564 | 5/1988 | Matsuda | 303/110 |
| 4,929,035 | 5/1990 | Sitimanuki | 303/106 |
| 5,003,481 | 3/1991 | Matsuda | 303/105 |

FOREIGN PATENT DOCUMENTS 63-195055  8/1988  Japan .

Primary Examiner—Matthew C. Graham
Attorney, Agent, or Firm—Burns, Doane, Swecker & Mathis

[57] ABSTRACT

The invention is directed to an arrangement for controlling a braking force applied to a road wheel, with a hydraulic braking pressure supplied to a wheel brake cylinder through an actuator. A standard speed is set on the basis of a wheel speed detected by a wheel speed sensor, and a peak of the wheel speed changing from increase thereof to decrease thereof is detected. A coefficient of friction of road surface is determined on the basis of a vehicle acceleration detected by an acceleration sensor. The actuator is controlled according to a pressure control mode selected from a decrease mode for decreasing the pressure, a hold mode for holding the pressure, a first increase mode for increasing the pressure when the wheel speed exceeds the standard speed, and a second increase mode for increasing the pressure when the wheel speed exceeds the peak of the wheel speed. The first increase mode is selected when the coefficient of friction exceeds a predetermined value and the standard speed exceeds a predetermined speed. The second increase mode is selected when the standard speed is lower than the predetermined speed.

5 Claims, 8 Drawing Sheets

ANTI-SKID CONTROL SYSTEM HAVING DUAL PRESSURE INCREASE MODES

BACKGROUND OF THE INVENTION

1. Field of the Invention

The present invention relates to an anti-skid control system for use in an automotive vehicle, and more particularly to an anti-skid control system for controlling a braking force applied to road wheels in braking operation to prevent the road wheels from being locked.

2. Description of the Prior Art

It is known that the vehicle stability or the controllability is influenced detrimentally depending upon the road surface condition, when road wheels are locked in abrupt braking operation. In view of the fact that, when a hydraulic braking pressure supplied to each wheel brake cylinder is increased, the rotational speed of the road wheel is rapidly reduced immediately before the coefficient of friction relative to the road wheel reaches a maximum, the wheel cylinder pressure is controlled in accordance with the deceleration of the vehicle in order that a slip rate of the road wheel results in around 20%, that is, the maximum coefficient of friction is obtained.

In order to prevent the road wheels from being locked in abrupt braking operation, therefore, there has been employed an anti-skid control system which controls the braking force by decreasing, increasing, or holding the hydraulic braking pressure supplied to wheel brake cylinders.

According to the anti-skid control system, in general, detected is a rotational speed of each road wheel or wheel speed, on the basis of which an estimated vehicle speed is set as a standard speed in response to an output from an acceleration sensor. Based upon the estimated vehicle speed, another standard speed is calculated and compared with each wheel speed. In response to the result of this comparison, controlled is the hydraulic braking pressure in the wheel brake cylinder mounted on each road wheel.

Figure 11:
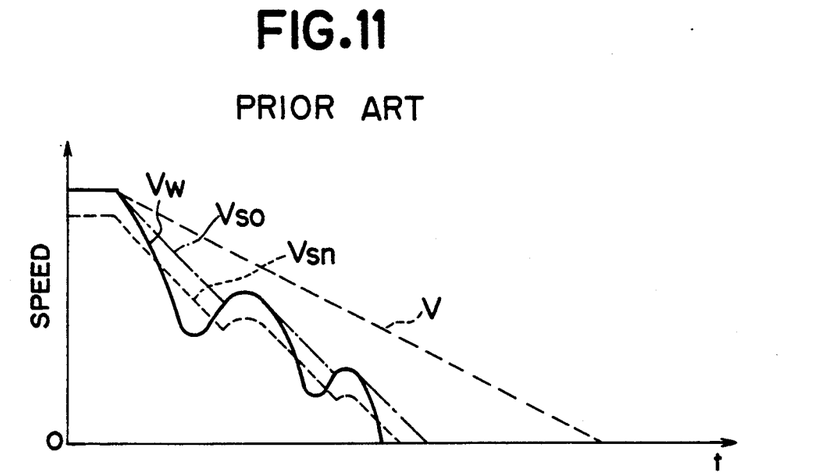
FIG.11 is a timing chart showing the operation of anti-skid control of the prior art under its map control mode.

For example, as shown in FIG.11, a standard speed Vsn is set to follow an estimated vehicle speed Vso with a certain speed difference. If a wheel speed Vw becomes lower than the standard speed Vsn (Vw<Vsn), and a wheel acceleration (including deceleration as negative value) Gw becomes lower than a standard acceleration G1 (Gw<G1) which are omitted in FIG.11, then a hydraulic braking pressure in the wheel brake cylinder is decreased. If it is detected that the wheel acceleration Gw becomes equal to or more than the standard acceleration G1 (Gw≧G1) so that the wheel speed Vw is recovering its speed, the hydraulic braking pressure is held as it is, whereas if the wheel acceleration Gw becomes equal to or more than the standard acceleration G1 (Gw≧G1) and the wheel speed Vw becomes equal to or more than the standard speed Vsn, the hydraulic braking pressure is increased.

The estimated vehicle speed Vso is set on the basis of the wheel speed Vw, an output of an acceleration detecting apparatus and the like, such that its decreasing rate will be greater than a decreasing rate of an actual vehicle speed V. Especially, in the case where the estimated vehicle speed Vso is set on the basis of the output of the acceleration detecting apparatus such as an acceleration sensor, an acceleration switch or the like, the estimated vehicle speed Vso is influenced largely by road conditions such as an inclined road surface, various noises caused by a vehicle vibration or the like. Therefore, the decreasing rate of the estimated vehicle speed Vso is set to a rate large enough to compensate for a difference between the actual deceleration and the detected deceleration. Consequently, the wheel speed Vw is controlled to decrease with a decreasing rate greater than that of the actual vehicle speed V. The difference between those speeds will be large, especially in the case where the vehicle is running on a road surface whose coefficient of friction (hereinafter, simply referred to as CF) is low.

As described above, if the anti-skid control operation using the standard speed Vsn is performed on a road with a low-CF surface, or a low-CF road, the wheel speed Vw will decrease in accordance with the estimated vehicle speed Vso before recovering the speed sufficiently to thereby cause a rapid locking of the wheel. In order to avoid this, generally employed is a control by which a decreasing mode is changed over to an increasing mode at the time when the value of the wheel acceleration Gw changes from a positive value to a negative value, i.e., changing from an increasing wheel speed to a decreasing wheel speed.

Figure 12:
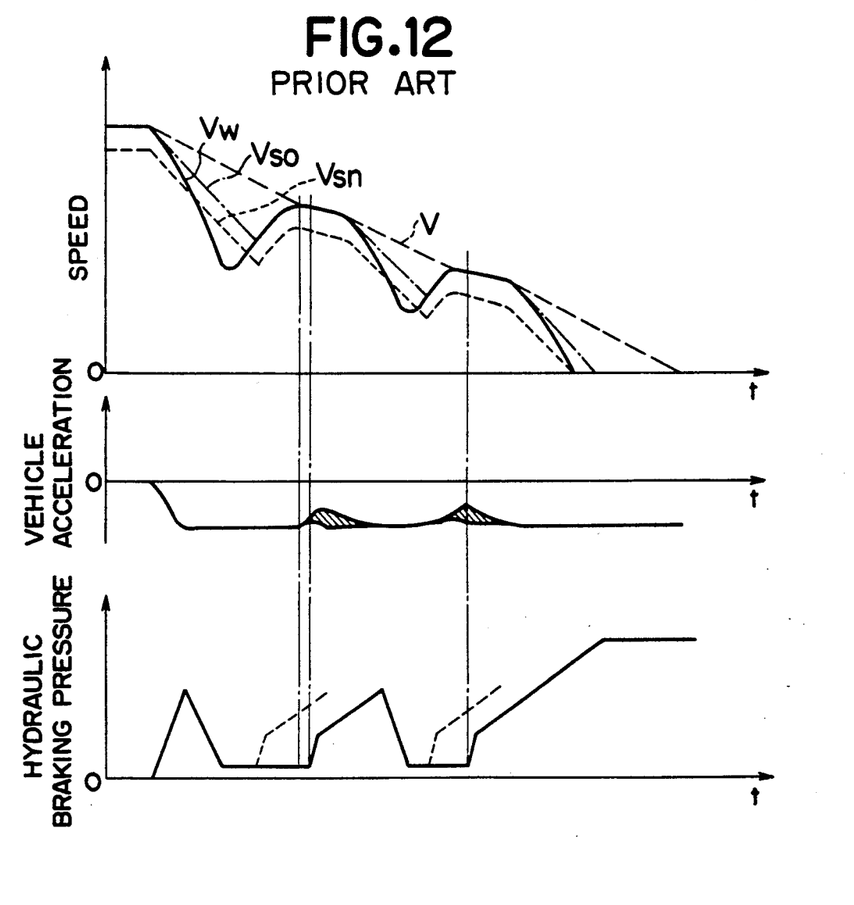
FIG.12 is a timing chart showing the operation of anti-skid control of the prior art under the control modes including a peak control mode.

That is, the hydraulic braking pressure is controlled to be increased when a high peak of the wheel speed Vw is caused as shown in FIG.12. According to this control, the rapid locking of the wheel on the low-CF road may be avoided, while the timing for increasing the hydraulic braking pressure will be delayed on a road with CF higher than that of the above road, such as a middle-CF road or a high-CF road, so that the stopping distance will be extended. In FIG.12, the hydraulic braking pressure characteristic indicates a delay in increasing the pressure is caused as shown by a solid line against a desired pressure increasing as shown by a phantom line. Consequently, the vehicle acceleration (deceleration in this case) is once reduced to cause not only a detrimental braking feeling, but also an extension of stopping distance with a range indicated by hatching in FIG.12. This extension of stopping distance caused by the delay in increasing the hydraulic braking pressure is large when the vehicle is running at high speed on the high-CF road, while it is small when the vehicle is running at low speed on the low-CF road.

In Japanese Patent Laid-open Publication No. Sho 63-195055, it is pointed out that the prior anti-locking control system starts increasing the hydraulic braking pressure at a high peak (a salient inflection point) of the wheel speed Vw, irrespective whether the coefficient of friction of the road surface (the road CF) is high or low, a timing for increasing the pressure is delayed on a middle-CF road or high-CF road to thereby overshoot the wheel speed Vw adjacent the high peak thereof, so that the stopping distance will be extended or a vehicle body will vibrate. To solve this problem, it is proposed in the above publication that a starting time for increasing the pressure shall be advanced on the middle-CF road or high-CF road. Namely, it is arranged that the starting time for increasing the pressure on the middle-CF road or high-CF road is changed to the time when the wheel speed decreases down to a low peak and then increases up to a predetermined speed Vt.

However, in the case where the decreasing rate of the estimated vehicle speed Vso is greater than that of the actual vehicle speed V as shown in FIG.11, if the starting time for increasing the pressure is set to the time when the wheel speed Vw reaches the predetermined speed Vt as proposed in the above publication, the wheel speed Vw decreases in accordance with the estimated vehicle speed Vso, so that the rapid locking of wheel may be caused. To avoid this, if the anti-skid control using the high peak of wheel speed as described above is employed, the stopping distance will be extended, especially in the case where the vehicle is running at high speed.

SUMMARY OF THE INVENTION

Accordingly, it is an object of the present invention to provide an anti-skid control system for an automotive vehicle which reduces a stopping distance through an anti skid control using a standard speed when a vehicle is running at high speed on a road surface of high coefficient of friction, and which prevents a rapid locking of the wheel and ensures a vehicle stability through an anti-skid control using a high peak of the wheel speed when the vehicle is running at low speed.

In accomplishing the above and other objects, an anti-skid control system for an automotive vehicle is installed in a vehicle braking system which has a wheel brake cylinder for applying a braking force to a road wheel and a hydraulic pressure generator for supplying a hydraulic braking pressure to the wheel brake cylinder. The anti-skid control system comprises actuating means which is disposed in a hydraulic circuit between the hydraulic pressure generator and the wheel brake cylinder and which controls the hydraulic braking pressure applied to the wheel brake cylinder, wheel speed detection means which detects a rotational wheel speed of the road wheel, standard speed setting means which sets a standard speed on the basis of at least the wheel speed detected by the wheel speed detection means, peak detection means which detects a peak of the wheel speed changing from increase thereof to decrease thereof, or a high peak, road condition determination means which determines a coefficient of friction of a road surface on which the vehicle is running. The anti-skid control system further comprises pressure control mode setting means which selects one of a plurality of pressure control modes that includes a decrease mode for decreasing the hydraulic braking pressure applied to the wheel brake cylinder, a hold mode for holding the pressure, a first increase mode for increasing the pressure when the wheel speed exceeds the standard speed, and a second increase mode for increasing the pressure when the wheel speed exceeds the peak speed, and which controls the actuating means according to the selected pressure control mode, and increase mode changing means which controls the pressure control mode setting means to select the first increase mode when the coefficient of friction exceeds a predetermined value and the standard speed exceeds a predetermined speed, and to select the second increase mode when the standard speed is lower than the predetermined speed.

In the above-described anti-skid control system, the increase mode changing means is preferably arranged to provide an auxiliary predetermined value greater than the predetermined value for the coefficient of friction, and controls the pressure control mode setting means to select the first increase mode irrespective of the value of the standard speed when the coefficient of friction exceeds the auxiliary predetermined value.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENT

Figure 1:
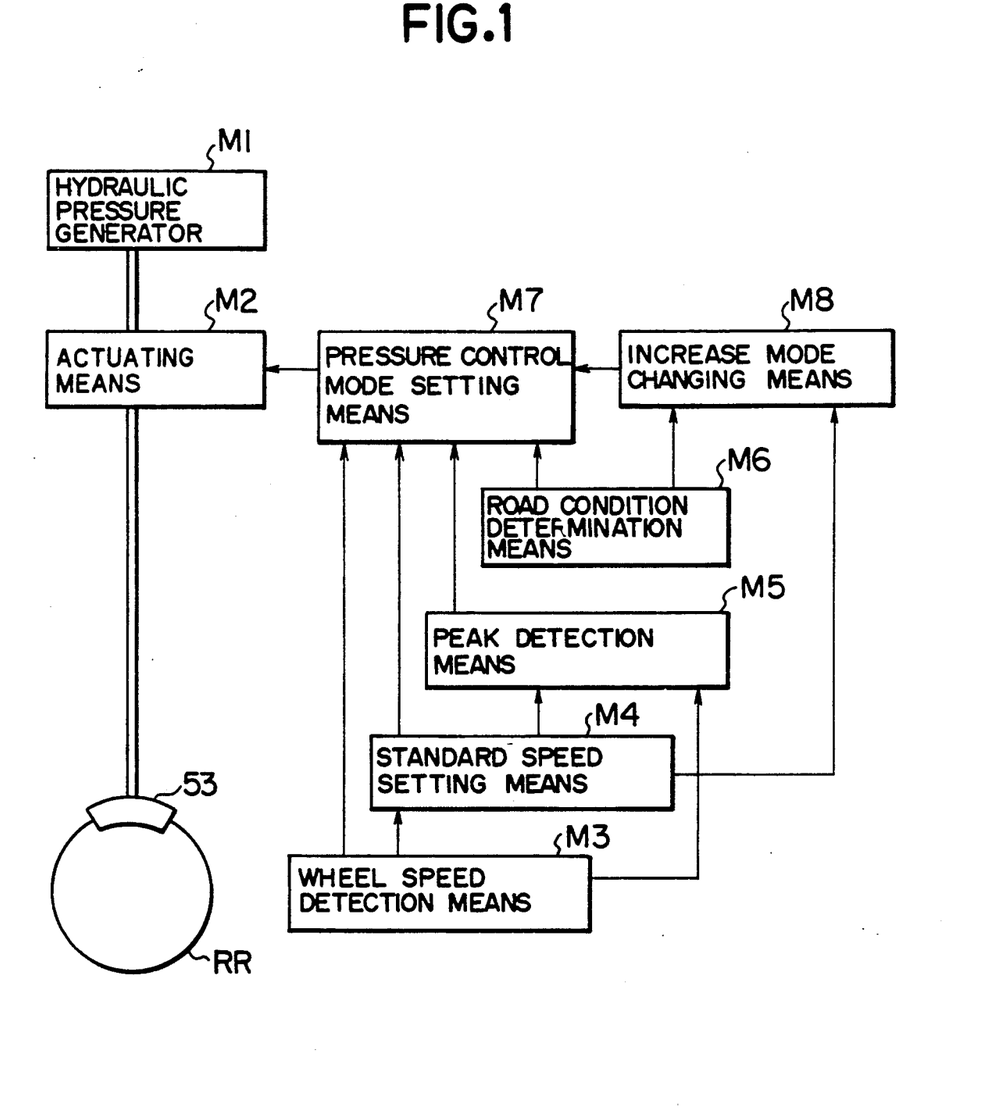
FIG.1 is a general block diagram illustrating an anti-skid control system according to the present invention.

Referring to FIG.1, there is schematically illustrated an anti-skid control system according to the present invention. In this anti-skid control system, there is provided with a wheel brake cylinder 53 which applies a braking force to a road wheel RR and a hydraulic pressure generator M1 which supplies a hydraulic braking pressure to the wheel brake cylinder 53. An actuating means M2 is disposed in a hydraulic circuit between the hydraulic pressure generator M1 and the wheel brake cylinder 53 to control the hydraulic braking pressure applied to the wheel brake cylinder 53.

In the anti-skid control system according to the present invention, a rotational wheel speed of the road wheel RR is detected by wheel speed detection means. A standard speed is set by standard speed setting means M4 on the basis of at least the wheel speed detected by the wheel speed detection means M3. A peak wheel speed in which the wheel speed changes from an increasing wheel speed to a decreasing wheel speed is detected by peak detection means M5. A coefficient of friction of a road surface on which the vehicle is running is determined by road condition determination means M6. In the pressure control mode setting means M7, one of the pressure control modes. The plurality of pressure control modes includes a decrease mode is selected wherein a plurality of hydraulic braking pressure is decreased, a hold mode wherein the pressure is held, a first increase mode wherein the pressure is increased when the wheel speed exceeds the standard speed, and a second increase mode wherein the pressure is increased when the wheel speed exceeds the peak speed. The actuating means M2 is controlled by the pressure control mode setting means M7 according to the selected pressure control mode.

The pressure control mode setting means M7 is controlled by an increase mode changing means M8 to select the first increase mode when the coefficient of friction exceeds a predetermined value and the standard speed exceeds a predetermined speed, and to select the second increase mode when the standard speed is lower than the predetermined speed.

Figure 2:
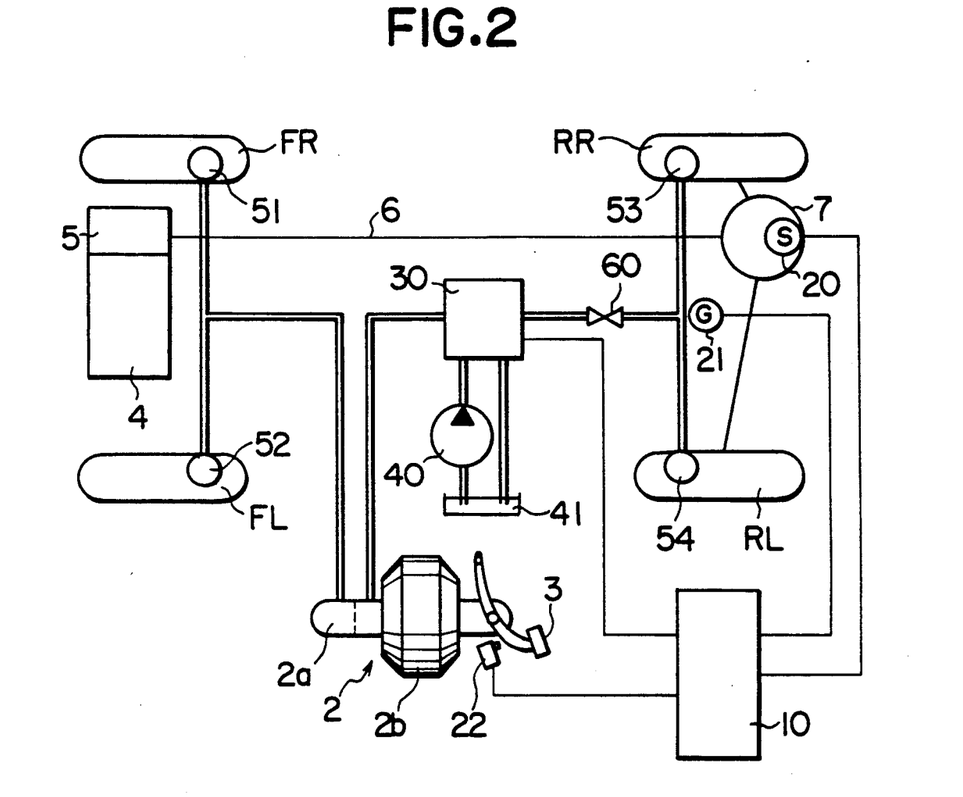
FIG.2 is a schematic block diagram of an anti-skid control system of an embodiment of the present invention.

More specifically, an embodiment of the present invention is illustrated in FIGS.2 to 6. Referring to FIG.2, there is illustrated a vehicle having an anti-skid apparatus which includes a hydraulic pressure generator 2, including a master cylinder 2a and a booster 2b operated in response to depression of a brake pedal 3. The master cylinder 2a of a so called tandem-type is directly connected to wheel brake cylinders 51, 52 of road wheels FR, FL, and connected to wheel brake cylinders 53, 54 of road wheels RR, RL via an actuator 30 and a proportioning valve 60. The road wheel FR designates a road wheel at the fore right side as viewed from the position of a driver's seat, the road wheel FL designates a road wheel at the fore left side, the road wheel RR designates a road wheel at the rear right side, and the road wheel RL designates a road wheel at the rear left side. In the present embodiment, a front and rear dual circuits system for braking front and rear road wheels independently is employed as is apparent from FIG.2. An internal combustion engine 4 mounted on the vehicle according to the present embodiment is connected to a transmission 5 of a well known type which is connected to a differential gear 7 through a propeller shaft 6. The differential gear 7 is connected to the road wheels RR, RL, so that a driving power of the engine 4 is transmitted thereto.

When the brake pedal 3 is depressed, the booster 2b is operated in response to depression of the brake pedal 3, so that the master cylinder 2a is boosted by the booster 2b. Consequently, a hydraulic braking pressure is discharged from the master cylinder 2a in response to depression of the brake pedal 3 and applied to the wheel brake cylinders 51 to 54. When the hydraulic braking pressure is applied to the wheel brake cylinders 51, 52, the road wheels FR, FL or non-driven road wheels are braked, and when it is applied to the wheel brake cylinders 53, 54, the road wheels RR, RL or driven road wheels are braked.

Figure 3:
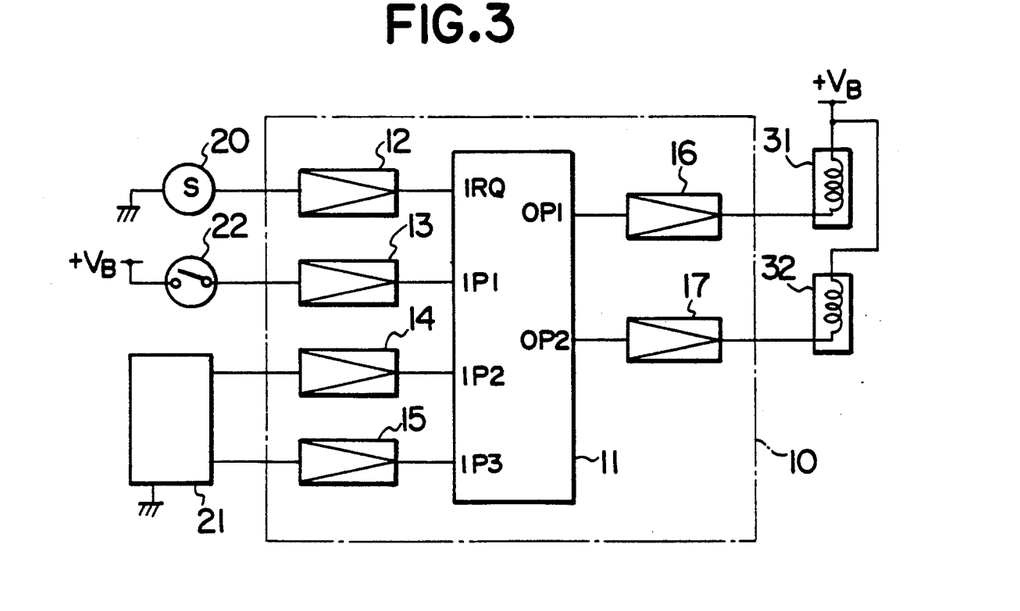
FIG.3 is a block diagram illustrating the arrangement of an electronic controller shown in FIG.2.

The actuator 30 is disposed between the master cylinder 2a and the wheel brake cylinders 53, 54, and connected to a pump 40 and a reservoir 41. The pump 40 is driven by the engine 4, so that the pressure of the brake fluid in the reservoir 41 is raised and supplied to the actuator 30 as a power pressure. The actuator 30 is provided with a pair of solenoid valves (not shown) having solenoids 31, 32 respectively as shown in FIG.3 which are energized or de-energized in response to outputs from an electronic controller 10. Then, an appropriate control mode is selected from such hydraulic pressure control modes as an "increase mode" where the hydraulic braking pressure in each of the wheel brake cylinders 53, 54 is increased when the hydraulic pressure discharged from the pump 40 is supplied thereto, a "decrease mode" where the hydraulic braking pressure is decreased when each of the wheel brake cylinders 53, 54 is communicated with the reservoir 41, and a "hold mode" where the hydraulic braking pressure is held as it is, so that the hydraulic braking pressure is controlled to prevent the road wheels RR, RL from being locked. Further, there is provided a "direct mode" where the master cylinder 2a is directly communicated with the wheel brake cylinders 53, 54.

Between the actuator 30 and the wheel brake cylinders 53, 54, there is disposed a proportioning valve 60 which decreases the hydraulic braking pressure applied to the rear wheel brake cylinders 53, 54 at a certain rate of the input hydraulic pressure to form an approximate ideal braking force distribution. In this embodiment, employed is a so called load-sensing type proportioning valve whose characteristic varies according to a supporting load at the road wheels RR, RL. At the differential gear 7 connected to the road wheels RR, RL, there is disposed a wheel speed sensor 20 by which a rotational speed of the propeller shaft 6, i.e., a wheel speed Vw of an average of the wheel speeds of the road wheels RR, RL is detected, so that a signal corresponding to the wheel speed Vw is fed to the electronic controller 10. At an appropriate position of the vehicle to which a vibration from the engine 4 or the road is hardly transmitted, there is disposed an acceleration sensor 21 which detects an acceleration of the vehicle and outputs in response thereto electric signals to the electronic controller 10 to calculate the estimated vehicle speed Vso and determine a coefficient of friction (referred to as CF) of a road surface, as described later.

There is also provided a brake switch 22 which is opened or closed in response to operation of the brake pedal 3. When the brake pedal 3 is depressed, the brake switch 22 is turned on, so that a stop lamp (not shown) is lighted and at the same time an electric signal indicating the depression of the brake pedal 3 is fed to the electronic controller 10. Thus, output signals of the wheel speed sensor 20, acceleration sensor 21 and brake switch 22 are fed to the the electronic controller 10. As shown in FIG.3, the electronic controller 10 is provided with a microprocessor 11, a waveform shaping circuit 12, input buffers 13, 14, 15 and output buffers 16, 17. As to the microprocessor 11 in this embodiment, employed is an one-chip microcomputer on the market including a central processing unit or CPU, a read-only memory or ROM for storing a program and a random access memory or RAM for reading and writing data to perform the program, which are connected with input ports and output ports via a common bus to execute the input/output operations relative to external circuits.

The signal detected by the wheel speed sensor 20 is fed to the waveform shaping circuit 12 where the signal is converted into a square wave and fed to an interruption port IRQ of the microprocessor 11. Thus, the microprocessor 11 is interrupted with a time interval which is determined in response to the wheel speed detected by the wheel speed sensor 20. The output signal of the brake switch 22 is fed to an input port IP1 through the input buffer 13 in the form of a high level (H) signal when the brake switch 22 is turned on, or a low level (L) signal when it is turned off. Further, the output signals of the acceleration sensor 21 are fed to input ports IP2, IP3 of the microprocessor 11 through the input buffers 14, 15 in response to the acceleration of the vehicle. An output port OP1 of the microprocessor 11 is connected to the solenoid 31 for one of the electromagnetic valves in the actuator 30 through the output buffer 16. An output port OP2 is connected to the solenoid 32 for the other of the electromagnetic valves through the output buffer 17. The output buffers 16, 17 amplify the electric signals output from the output ports OP1, OP2 to energize the solenoids 31, 32 respectively.

Figures 4, 5:
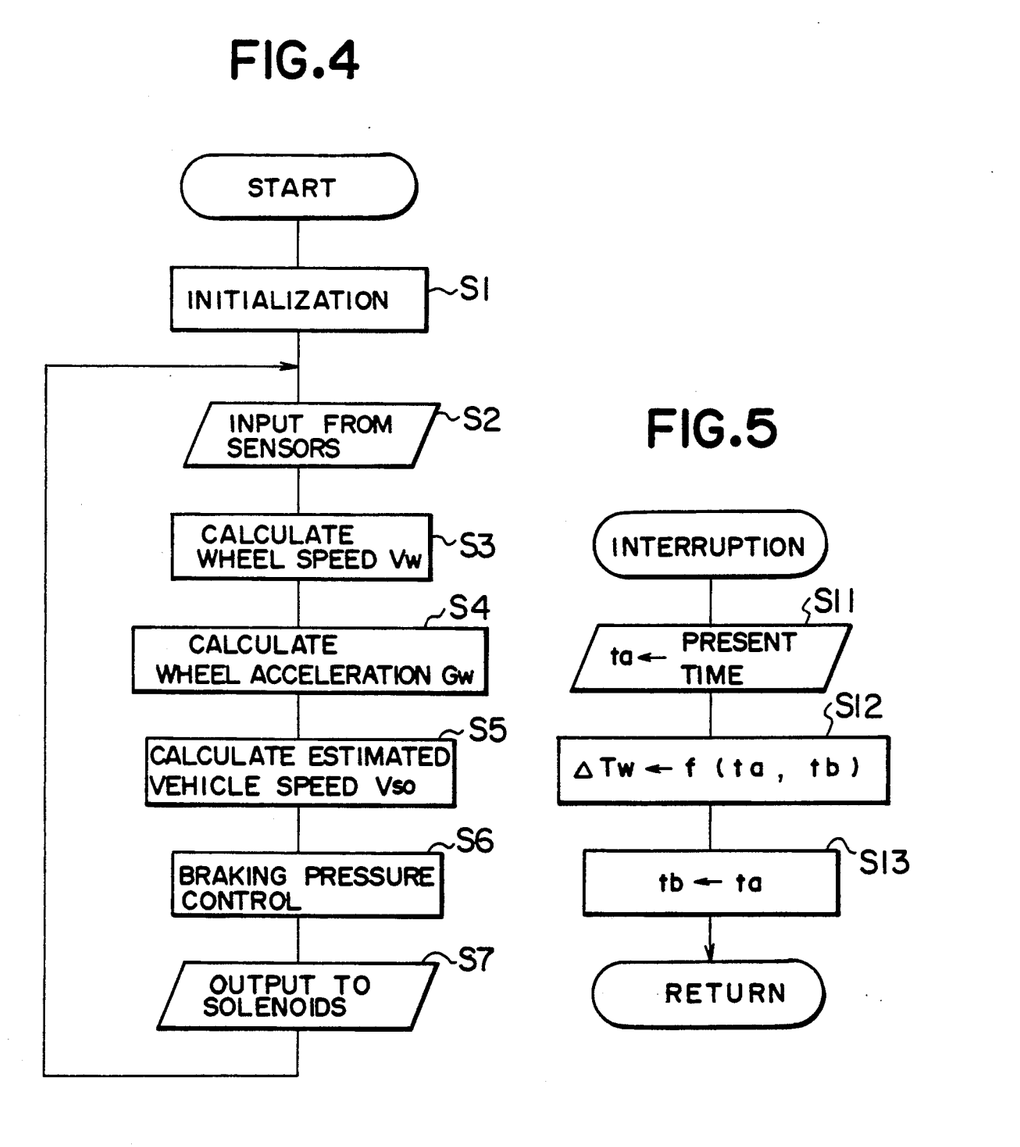
FIG.4 is a flowchart showing a main routine executed in a microprocessor according to an embodiment of the present invention.
FIG.5 is a flowchart showing an interruption routine executed in the microprocessor.

A program routine executed by the electronic controller 10 for the anti-skid control will now be described with reference to flowcharts shown in FIGS.4-6. The program includes a main routine shown in FIG.4, and an interruption routine shown in FIG.5 which is performed when an input is fed to the interruption port IRQ. The program routine starts when a power source to the electronic controller 10 is turned on, and provides for initialization of the system at Step S1, wherein ta, tb and a control flag described later are cleared to be zero, and wherein outputs of the output ports OP1, OP2 are arranged to de-energize the solenoids 31, 32. Then, the program proceeds to Step S2 where the signal indicating the condition of the brake switch 22 and the signal output in response to the vehicle acceleration detected by the acceleration sensor 21 are fed to the microprocessor 11.

The program proceeds further to Step S3 where an average wheel speed Vw (simply referred to as wheel speed Vw) of the rear road wheels RR, RL is calculated on the basis of a period $\Delta Tw$ of the signal output from the wheel speed sensor 20, in accordance with the following equation:

$$Vw = K/\Delta Tw \quad (1)$$

where K is a constant which is set according to the characteristics of the wheel speed sensor 20, and the period Tw is obtained through the interruption routine which is executed separately and described later. Then, at Step S4, the wheel acceleration Gw of the rear road wheels RR, RL is calculated on the basis of the wheel speed Vw calculated at Step S3, in accordance with the following equations (2) and (3):

$$Int = (\Delta Tw(n) + \Delta Tw(n-1))/2 \quad (2)$$

$$Gw(n) = (Vw(n) - Vw(n-1))/Int \quad (3)$$

where "Int" corresponds to a time interval of the interruption, $Vw(n)$ and $\Delta Tw(n)$ respectively correspond to the wheel speed and the time period obtained in the present cycle of the routine, while $Vw(n-1)$ and $\Delta Tw(n-1)$ respectively correspond to the wheel speed and the period obtained in the previous cycle of the routine.

Accordingly, an estimated vehicle speed Vso is calculated at Step S5, on the basis of the vehicle acceleration Gd detected by the acceleration sensor 21 and the wheel speed Vw calculated at Step S3. The estimated vehicle speed Vso is calculated as a standard speed in accordance with the following equations:

$$Vd(n) = Vso(n-1) - L \cdot Gd(n) \cdot Int \quad (4)$$

$$Vso = Max(Vw(n), Vd(n)) \quad (5)$$

where Max(a,b) as in the above equation represents a function providing a larger one of "a" and "b", $Vd(n)$ represents a set speed obtained in the present cycle, L is a constant determined in accordance with characteristics of the acceleration sensor 21, and $Vso(n)$ corresponds to the estimated vehicle speed obtained in the present cycle, while $Vso(n-1)$ corresponds to the estimated vehicle speed obtained in the previous cycle of the routine.

The program further proceeds to Step S6 where it is determined how the hydraulic braking pressure in the wheel brake cylinders 53, 54 is regulated according to the wheel speed Vw obtained at Step S3, the wheel acceleration Gw obtained at Step S4 and standard speeds Vsn, Vsnh set in accordance with the estimated vehicle speed Vso obtained at Step S5 with a certain speed difference therebetween. This Step S6 is described later in detail. The program then proceeds to Step S7 where signals for driving the solenoids 31, 32 in response to the result determined at Step S6 are output from the output ports OP1, OP2, so that the hydraulic braking pressure is increased, decreased or held in response to the result. The above-described Steps S1 to S7 are repeatedly executed. In the case where the slip rates to the road surface of the road wheels RR, RL are large with the wheel speed Vw decreased rapidly, the hydraulic braking pressure is decreased to rotate the road wheels RR, RL, so that the road wheels RR, RL are prevented from being locked.

Next will be explained with reference to FIG.5, the interruption routine wherein the time interval between the interruption requirement made in the previous cycle and the interruption requirement made in the present cycle, i.e., the period $\Delta Tw$ of the electric signal fed from the wheel speed sensor 20 is obtained. At Step S11, the present time "ta" is set by the free run timer, and the program proceeds to Step S12 where a time difference between the present time "ta" and the time "tb" when the interruption requirement was made is calculated, so that the period Tw of the output signal of the wheel speed sensor 20 is obtained. Then, at Step 13, the time "tb" is reset for a next interruption requirement. After execution of those Steps S11 to S13, the main routine shown in FIG.4 is executed.

Figure 6:
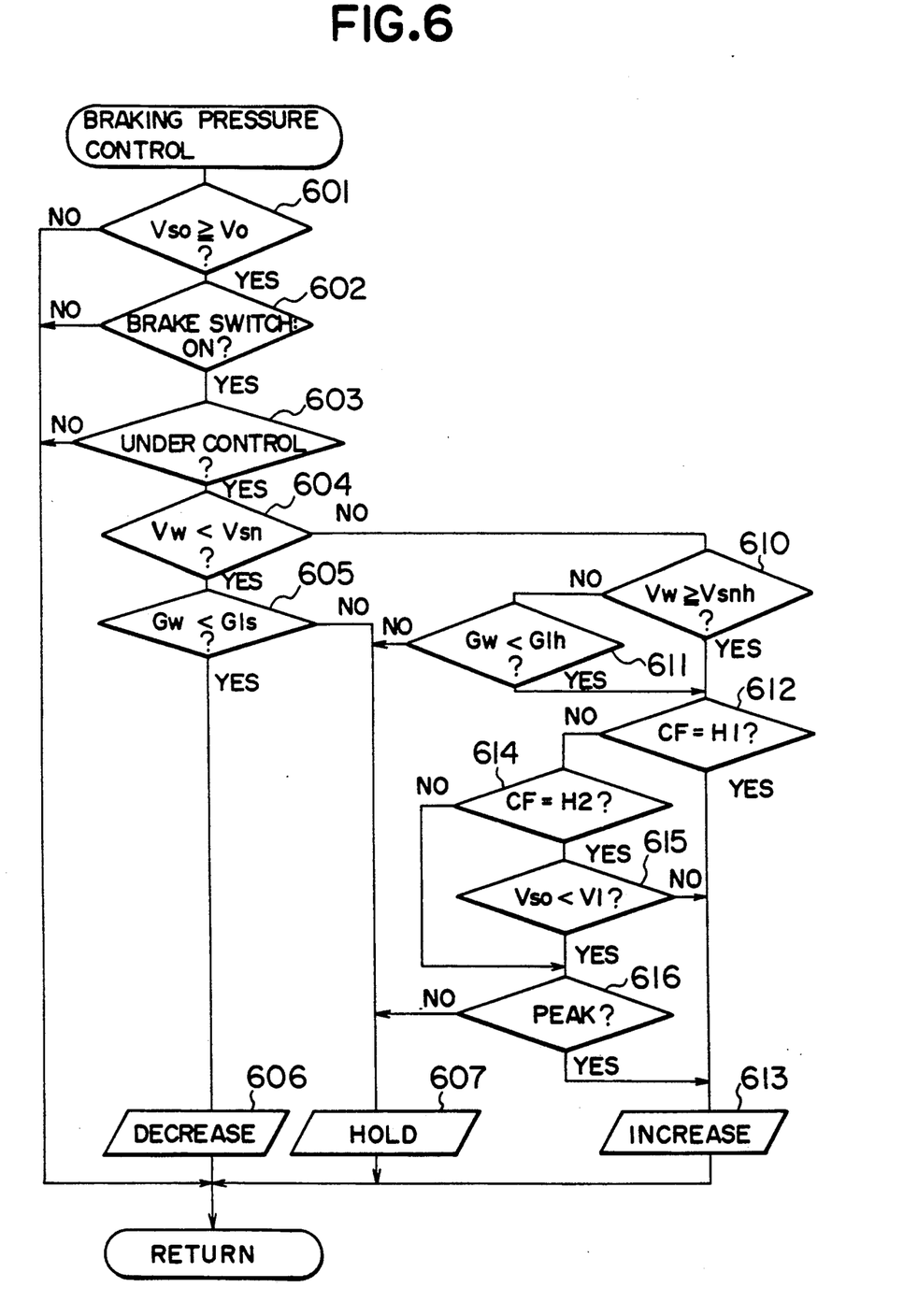
FIG.6 is a flowchart showing a subroutine executed in the microprocessor.

FIG.6 shows a subroutine of Step S6 in FIG.4 for the control of the hydraulic braking pressure in accordance with a control mode selected from decreasing, increasing and holding modes (hereinafter, referred to as braking pressure control). Firstly, at Step 601 it is determined whether the braking pressure control shall be initiated or not. Actually, the estimated vehicle speed Vso is compared with a predetermined speed Vo which is a standard speed for determining whether the vehicle is stopped, and which is set to be about 5 km/h in the present embodiment. If the estimated vehicle speed Vso is equal to or more than the predetermined speed Vo, the program proceeds to Step 602. If the estimated vehicle speed Vso is less than the predetermined speed Vo, the program returns to the main routine, so that the braking pressure control is not performed. At Step 602, it is determined whether the brake switch 22 is in the ON or OFF condition. When the brake switch 22 is in the ON condition, the program proceeds to Step 603, whereas when the brake switch 22 is in the OFF condition, the program returns to the main routine, so that the braking pressure control is not performed. Then, the program proceeds to Step 604 where it is determined whether the control flag is set or not. If the control flag is set, the program proceeds to Step 605, otherwise it proceeds to the main routine, so that the braking pressure control is not performed. The control flag is a flag which is set when the braking pressure control is initiated, and continuously set while the braking pressure control is performed.

Then, at Step 604, it is determined whether the rear road wheels RR, RL, or driven wheels are slipping or not. Actually, it is determined whether the wheel speed Vw of the rear road wheels RR, RL is less than the standard speed Vsn. If the wheel speed Vw is less than the standard value Vsn (Vw<Vsn), it is determined that the rear road wheels RR, RL are slipping, and the program proceeds to Step 605. If the wheel speed Vw is equal to or more than the standard speed Vsn (Vw≧Vsn), the program proceeds to Step 610 as described later.

At Step 605, it is determined whether the wheel acceleration Gw of the rear road wheels RR, RL is less than a predetermined acceleration G1s. If the wheel acceleration Gw is less than the predetermined acceleration G1s (GW<G1s), it is determined that the rear road wheels RR, RL are in a condition immediately before they are locked. Then, the program proceeds to Step 606 where the decrease mode signal is output, and returns to Step S7 in the main routine where the energizing or de-energizing of the solenoids 31, 32 is made so that the hydraulic braking pressure in the wheel brake cylinders 53, 54 is decreased. Accordingly, if the decrease mode signal is output at Step 606, the wheel brake cylinders 53, 54 are communicated with the reservoir 41 to decrease the hydraulic braking pressure. If the wheel acceleration Gw is equal to or more than the predetermined acceleration G1s (Gw≧G1s), it is determined that the road wheels RR, RL are not locked immediately, and the program proceeds to Step 607, where the hold mode signal is output.

If the wheel speed Vw is not less than the standard speed Vsn, the program proceeds to Step 610, where it is determined whether the rear road wheels RR, RL are slipping or not. If the wheel speed Vw is less than the standard speed Vsnh, the program proceeds to Step 611. If it is not less than the standard speed Vsnh, the program proceeds to Step 612.

Figure 7:
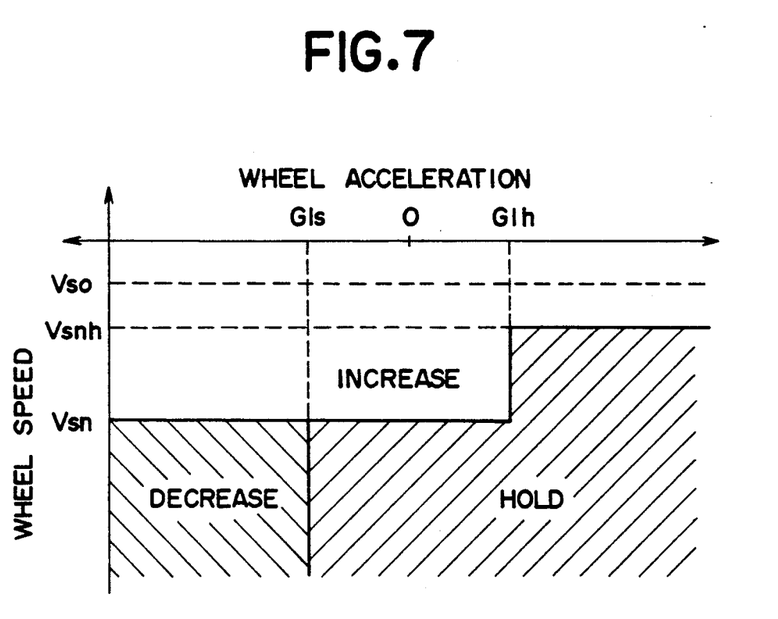
FIG.7 is a diagram showing pressure control modes selected in accordance with a wheel speed and a wheel acceleration under a map control mode according to an embodiment of the present invention.
Figure 9:
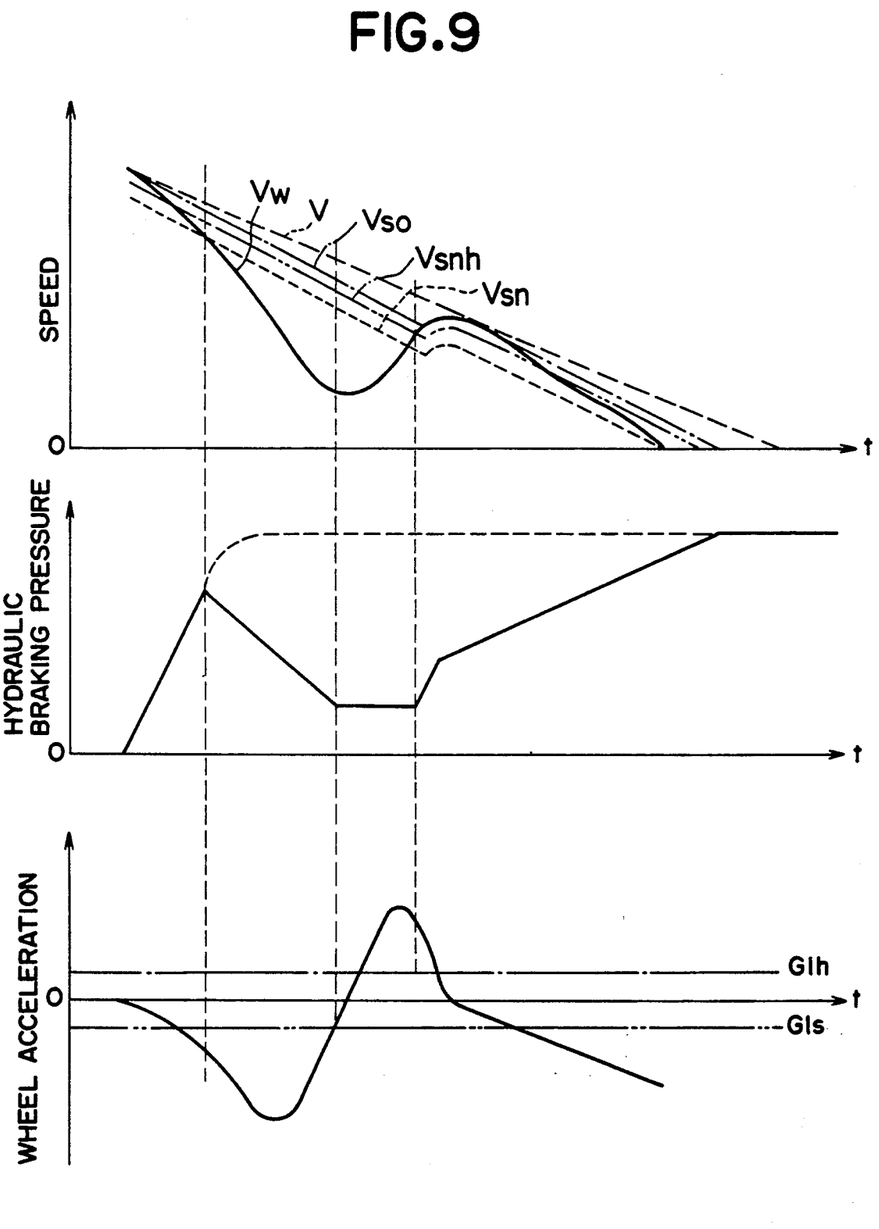
FIG.9 is a timing chart showing the operation under the map control mode according to an embodiment of the present invention.

At Step 611, it is determined whether the wheel acceleration Gw is less than a predetermined acceleration G1h. If the wheel acceleration Gw is not less than the predetermined acceleration G1h, the program proceeds to Step 607 where the hold mode signal is output. If it is determined that the wheel acceleration Gw is less than the predetermined acceleration G1h, the program proceeds to Step 612 where it is determined whether the coefficient of friction of road surface (road CF) corresponds to a first value of high-CF (hereinafter, referred to as first high-CF) H1 or not. If the result is affirmative, the program proceeds to Step 613 where the increase mode signal is output. In accordance with the results of Steps 604, 605, 610 and 611, therefore, one of the increase, hold and decrease modes is selected depending upon the values of the wheel speed Vw and wheel acceleration Gw as disclosed in FIG.7. Namely, a so-called map control is performed to obtain such a characteristic as shown in FIG.9.

If it is determined at Step 612 that the road CF does not correspond to the first high-CF H1, the program proceeds to Step 614 where it is determined whether the road CF corresponds to a second value of high-CF (hereinafter, referred to as second high-CF) H2 or not. Whether the road CF corresponds to the first or second high-CF H1 or H2 is determined by the output from the acceleration sensor 21. For example, the first high-CF H1 is provided for a road surface such as a dry asphalt road, whereas the second high-CF H2 is provided for a road surface such as a wet asphalt road.

If the road CF is the second high-CF H2, the program proceed to Step 615 where it is determined whether the estimated vehicle speed Vso is less than a predetermined speed V1. If it is not less than the predetermined speed V1, the program proceeds to Step 613 where the increase mode signal is output. If it is determined that the estimated vehicle speed Vso is less than the predetermined speed V1, the program proceeds to Step 616 where it is determined whether the wheel speed Vw has reached a high peak. If it is determined that the increasing wheel speed Vw starts decreasing to have reached the salient inflection point, the program proceeds to Step 613 where the increase mode signal is output. Whereas, if it has not reached the salient inflection point or high peak, the hold mode signal is output at Step 607. This mode of increasing pressure operation is called as a peak control mode in contrast with the map control mode as described before.

Figure 8:
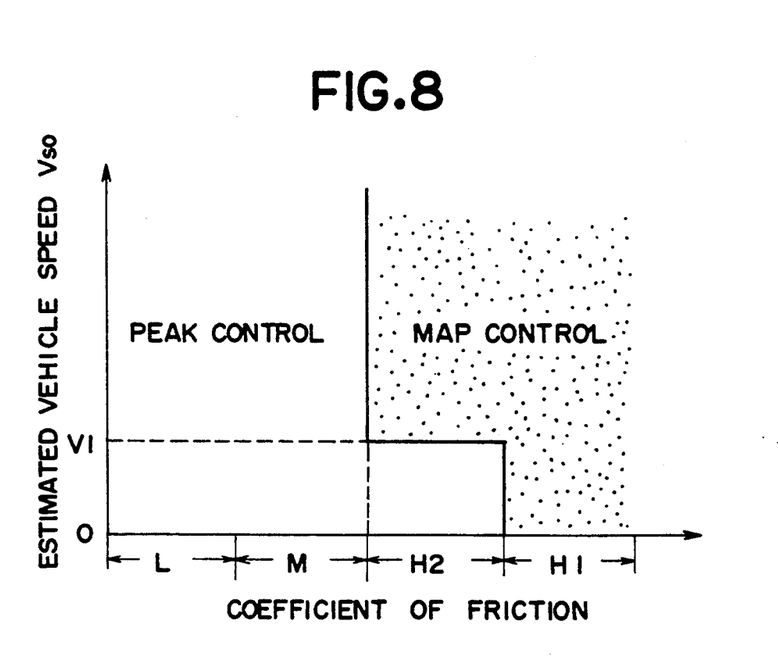
FIG.8 is a diagram showing a peak control mode and a map control mode selected in accordance with an estimated vehicle speed and a coefficient of friction of a road surface according to an embodiment of the present invention.

If it is determined that the road CF does not correspond to the second high-CF H2, i.e., if it corresponds to the middle-CF M or the low-CF L, the program proceeds to Step 616 where the peak determination is made. In accordance with the result of this determination, the increase mode signal is output at Step 613, or the hold mode signal is output at Step 607. That is, as shown in FIG.8, either the map control mode as the first increase mode or the peak control mode as the second increase mode is selected in accordance with the values of the road CF and the estimated vehicle speed Vso. Thus, the predetermined value according to the present invention is a value which distinguishes between the second high-CF H2 and the middle-CF M as shown in FIG.8. And, the auxiliary predetermined value according to the present invention is a value which distinguishes between the first high-CF H1 and the second high-CF H2.

Figure 10:
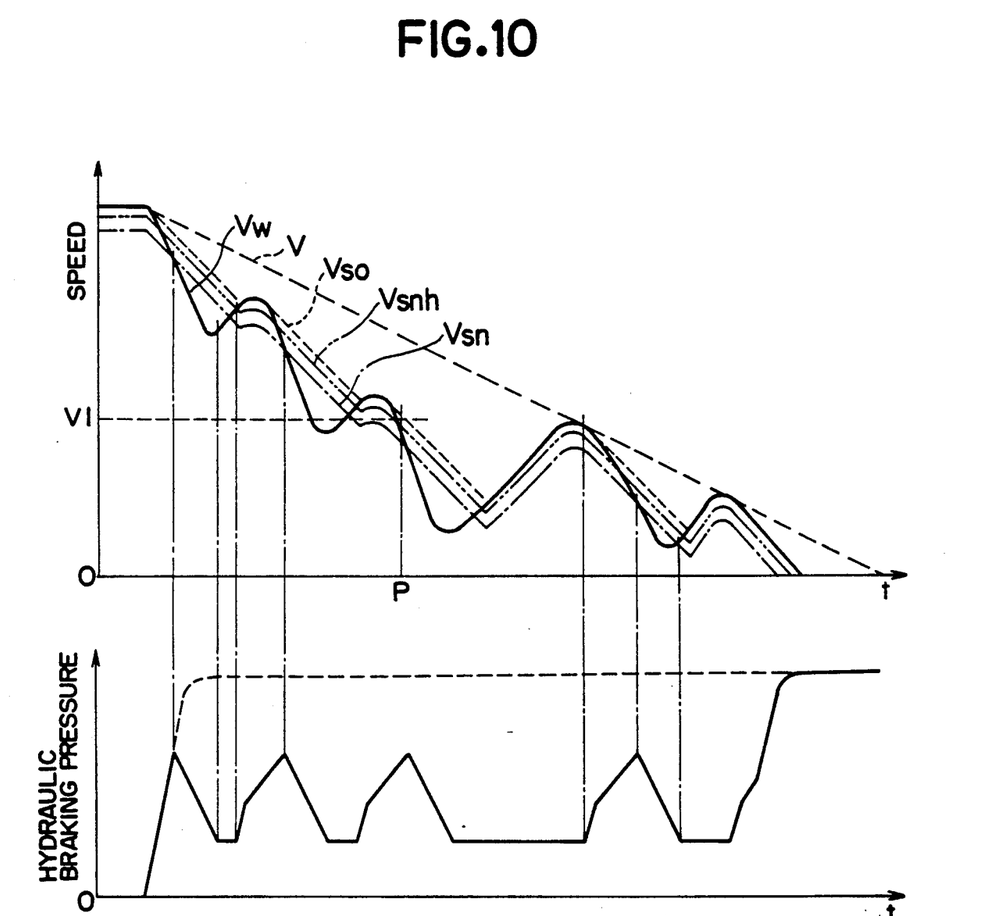
FIG.10 is a timing chart showing the operation of anti-skid control of an embodiment of the present invention.

FIG.10 illustrates an example of anti-skid control in braking operation, where the standard speeds Vsn, Vsnh are calculated from the estimated vehicle speed Vso with a certain speed difference therebetween respectively. The standard speed Vsn is used for determining the initiation of decreasing the pressure, while the standard speed Vsnh is used for determining the initiation of increasing the pressure, so that a hydraulic braking pressure control of a hysteresis characteristic is performed. As long as the estimated vehicle speed Vso is equal to or greater than the predetermined speed V1, the hydraulic braking pressure is increased under the map control mode. When the estimated vehicle speed Vso is decreased to be lower than the predetermined speed V1 at the point P in FIG.10, the peak control mode is initiated to prevent the wheel speed Vw from being reduced rapidly. Consequently, when the vehicle is running at high speed on the high-CF road, the hydraulic braking pressure starts increasing early under the control mode using the standard speed, while the rapid locking of wheel is effectively prevented under the peak control mode when the vehicle is running at low speed.

It should be apparent to one skilled in the art that the above-described embodiment is merely illustrative of but a few of the many possible specific embodiments of the present invention. Numerous and various other arrangements can be readily devised by those skilled in the art without departing from the spirit and scope of the invention as defined in the following claims.

What is claimed is:

1. An anti-skid control system for an automotive vehicle for installation in a vehicle braking system having a wheel brake cylinder for applying a braking force to a road wheel and a hydraulic pressure generator for supplying a hydraulic braking pressure to said wheel brake cylinder, comprising:

actuating means disposed in a hydraulic circuit between said hydraulic pressure generator and said wheel brake cylinder for controlling said hydraulic braking pressure applied to said wheel brake cylinder;

wheel speed detection means for detecting a rotational wheel speed of said road wheel;

standard speed setting means for setting a standard speed on the basis of at least said wheel detected by said wheel speed detection means;

peak detection means for detecting a peak wheel speed in which the wheel speed changes from an increasing wheel speed to a decreasing wheel speed;

road condition determination means for determining a coefficient of friction of a road surface on which said vehicle is running;

pressure control mode setting means for selecting one of a plurality of pressure control modes that include a decrease mode for decreasing said hydraulic braking pressure applied to said wheel brake cylinder, a hold mode for holding said hydraulic braking pressure, a first increase mode for increasing said hydraulic braking pressure when said wheel speed excess said standard speed, and a second increase mode for increasing said hydraulic braking pressure when said wheel speed exceeds said peak wheel speed, said pressure control mode setting means controlling said actuating means according to the selected pressure control mode; and increase mode changing means for controlling said pressure control mode setting means to select said first increase mode when said coefficient of friction exceeds a predetermined value and said standard speed exceeds a predetermined speed, and to select said second increase mode when said standard speed is lower than said predetermined speed.

2. An anti-skid control system for an automotive vehicle as set forth in claim 1, wherein said increase mode changing means provides an auxiliary predetermined value greater than said predetermined value for said coefficient of friction, and controls said pressure control mode setting means to select said first increase mode when said coefficient of friction exceeds said auxiliary predetermined value.

3. An anti-skid control system for an automotive vehicle as set forth in claim 1, wherein said pressure control mode setting means selects said second increase mode when said wheel speed detected by said wheel speed detection means exceeds a second standard speed, the second standard speed being less than said standard speed set by said standard speed setting means.

4. An anti-skid control system for an automotive vehicle as set forth in claim 3, wherein said pressure control mode setting means selects said second increase mode when a wheel acceleration calculated from said wheel speed is less than a predetermined acceleration.

5. An anti-skid control system for an automotive vehicle as set forth in claim 1, wherein said road condition determination means includes an acceleration sensor disposed in said vehicle for detecting an acceleration of said vehicle and producing a signal corresponding thereto, and wherein said road condition determination means determines said coefficient of friction on the basis of said acceleration detected by said acceleration sensor.

* * * * *

UNITED STATES PATENT AND TRADEMARK OFFICE
CERTIFICATE OF CORRECTION

PATENT NO. : 5,236,255
DATED : August 17, 1993
INVENTOR(S) : Kazutaka KUWANA et al It is certified that error appears in the above-indentified patent and that said Letters Patent is hereby corrected as shown below:

On the title page,
   Item [75], delete "Anto" and insert -- Anjo --.

Signed and Sealed this

Twelfth Day of April, 1994

*Attest:*

BRUCE LEHMAN

*Attesting Officer*     *Commissioner of Patents and Trademarks*